United States Patent [19]
Pickles et al.

[11] 3,851,351
[45] Dec. 3, 1974

[54] WINDSHIELD WIPER DRIVE

[75] Inventors: Joseph Pickles, Birmingham; Albert Duckworth, Dearborn Heights, both of Mich.

[73] Assignee: Ferro Manufacturing Corporation, Detroit, Mich.

[22] Filed: Feb. 5, 1973

[21] Appl. No.: 329,678

[52] U.S. Cl. ............................ 15/250.25, 15/250.27
[51] Int. Cl. ............................................. B60s 1/20
[58] Field of Search....... 15/250.18, 250.19, 250.24, 15/250.25, 250.26, 250.27, 250.3, 250.01; 296/84

[56] References Cited
UNITED STATES PATENTS
2,568,922  9/1951  Malone .................... 15/250.27 X
2,824,332  2/1958  Gibson ...................... 15/250.25

FOREIGN PATENTS OR APPLICATIONS
622,801  5/1949  Great Britain ............... 15/250.27

*Primary Examiner*—Peter Feldman
*Attorney, Agent, or Firm*—Whittemore, Hulbert & Belknap

[57] ABSTRACT

A windshield wiper system in which an elongated well extends transversely of the vehicle forward of the windshield which receives a master windshield wiper unit including a motor and a slave unit, the master unit and slave unit being interconnected by a push-pull power transmission device, all components of the system being received in the well to provide access for repair.

5 Claims, 7 Drawing Figures

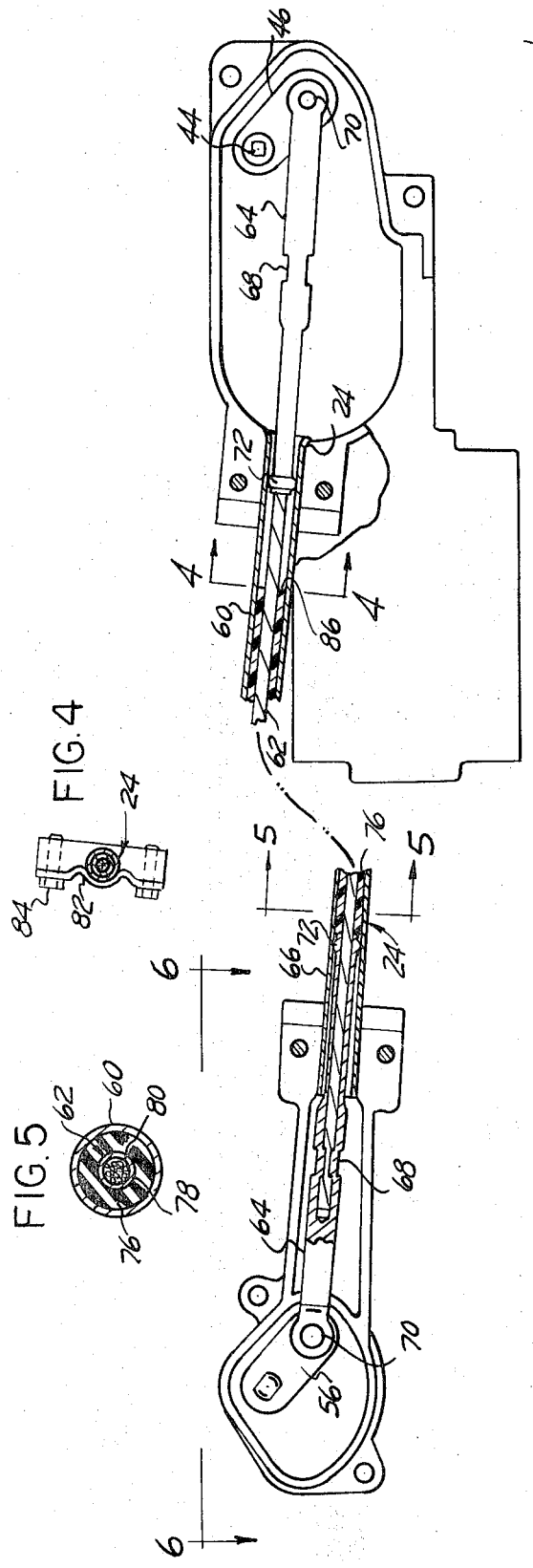
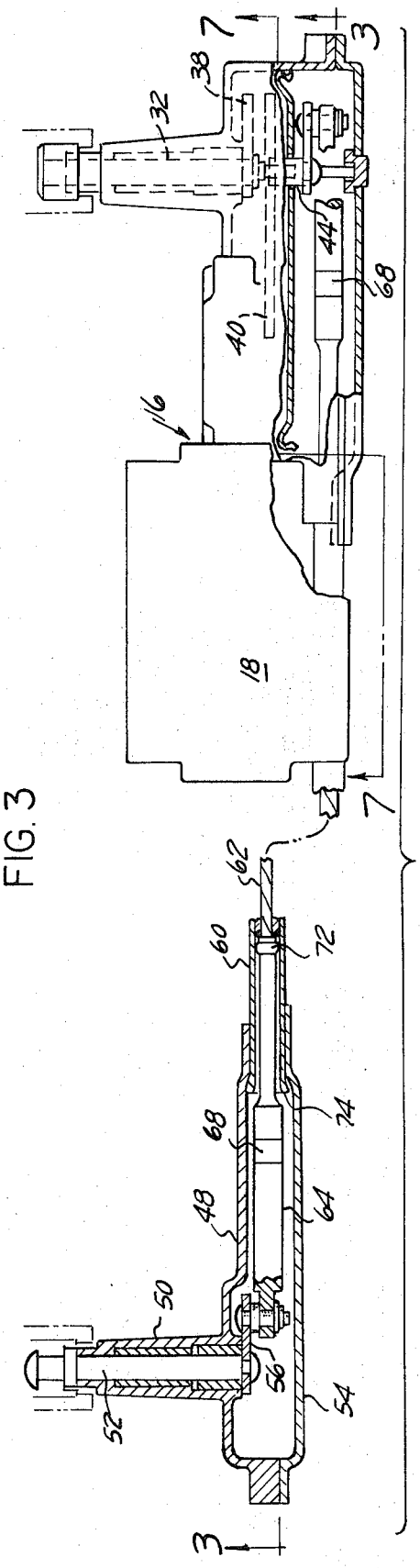

3,851,351

WINDSHIELD WIPER DRIVE

BRIEF SUMMARY OF THE INVENTION

Prior to the present invention, windshield wiper systems for automotive vehicles have been developed in which an elongated well is provided which extends transversely of the vehicle forward of the windshield. When the windshield wipers are de-energized they move to a parked position in which they are received in and concealed by the well. An objection to the systems as provided prior to the present invention is that the windshield wiper motor and slave unit (for driving two windshield wiper arms) are mounted rearwardly of the well. Drive shafts extend through the rear wall of the well onto which the wiper blade arms are mounted. In the case of failure, the main drive or motor unit is not readily accessible for repair.

In accordance with the present invention the windshield wiper system includes a motor and main drive unit assembly and a slave unit in which the motor and main drive unit and slave unit are located in the well and hence, are accessible from the top of the well for removal and repair, and in which the main drive unit and slave unit are mechanically interconnected by a push-pull drive transmission.

Specifically, the motor of the system, which is preferably electrically driven, drives a worm which in turn rotates a worm gear connected by a link to an actuating arm on the shaft of the main drive unit. The shaft of course has means thereon for mounting a windshield wiper arm. Rotation of the motor results in continuous rotation of the worm gear and the linkage between the worm gear and the actuating arm is such that the drive shaft is oscillated back and forth through the required angular arc to produce the desired movement of the windshield wiper blade over the windshield. The slave unit includes a housing having a shaft generally the same as the drive shaft of the main drive unit and this shaft has an actuating arm thereon which may be identical with the actuating arm of the main drive unit. The two arms are interconnected by a longitudinally movable transmission element which is in the form of a flexible push-pull cable movable longitudinally in a curved housing.

The geometry of the parts is such that a windshield wiper blade connected to the drive shaft of the slave unit has precisely the same movement over the windshield as the blade of the main or master unit.

BRIEF DESCRIPTION OF THE DRAWINGS

FIG. 2 is an elevational view taken perpendicular to the drive shafts with parts broken away.

FIG. 3 is a view generally on the line 3—3, FIG. 2, with covers removed to expose the mechanism.

FIG. 4 is a fragmentary sectional view on the line 4—4, FIG. 3.

FIG. 5 is an enlarged sectional view on the line 5—5, FIG. 3.

DETAILED DESCRIPTION

Figure 1:
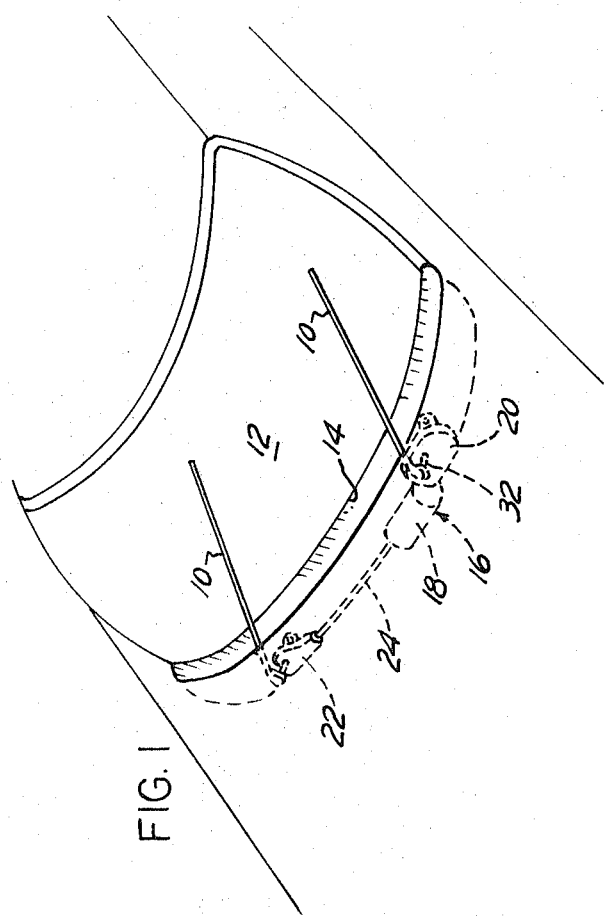
FIG. 1 is a perspectic diagrammatic view illustrating the location and arrangement of the windshield wiper system.

Referring first to FIG. 1, there is illustrated windshield wiper arms 10 mounted for swinging movement over a conventional curved windshield 12 as presently provided on automotive vehicles. Forwardly of the windshield 12 the hood is provided with a transversely elongated well 14 which is curved to conform to the transverse curvature of the windshield. The well 14 is adapted to house and conceal windshield wiper arms and blades 10 when they move to the parked position.

The windshield wiper system comprises a master assembly indicated generally at 16 which includes the motor 18 and the master drive unit 20. It also includes the slave unit 22 which is connected to the master drive unit by power transmission means 24 comprising a flexible push-pull cable.

Since the master unit 20 and the slave unit 22 are positioned forwardly of portions of the windshield 12 which are transversely inclined with respect to each other, the drive shafts of the respective units extend at an angle to each other and accordingly the power transmission between the master slave units must be capable of transmitting like motion between the wiper arms despite the angular obliquity therebetween.

Figure 7:
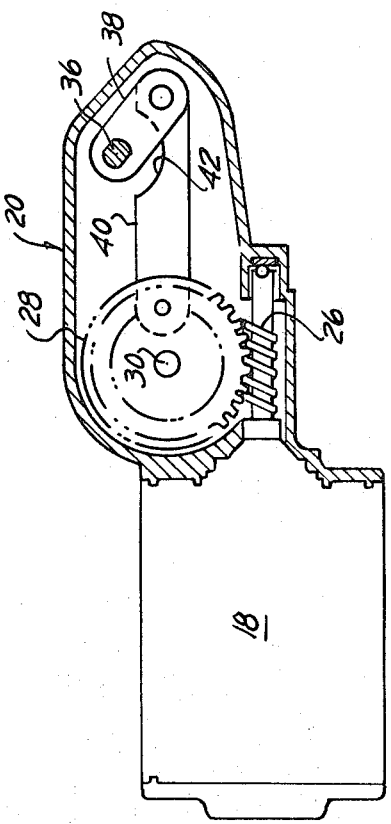
FIG. 7 is a sectional view on the line 7—7, FIG. 2.
Figure 6:
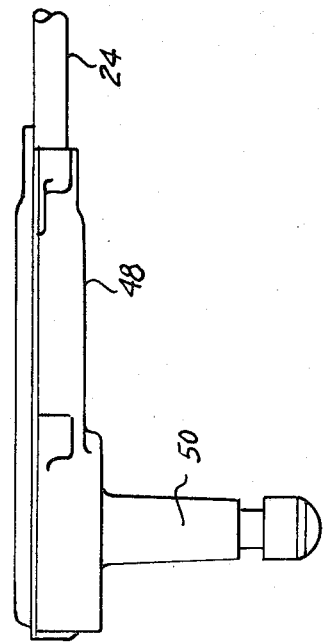
FIG. 6 is an elevational view of the slave unit.

The master assembly 16 comprises the motor 18, which as best seen in FIG. 7, has an output drive shaft 26 in the form of a worm. The master drive unit 20 contains a worm gear 28 in mesh with the worm 26, mounted on a shaft 30. The master unit drive shaft 32 is connected in driving relation by a noncircular portion 36 connected to the main drive arm 38. The arm 38 and the worm gear 28 are interconnected by a link 40 which is oscillated back and forth as the worm gear 28 rotates continuously in a single direction. The arm or link 40 is recessed at 42 to avoid interference with the main drive shaft 32.

Accordingly, as the motor 18 is energized for continuous rotation in one direction, the main wiper arm drive shaft 32 is oscillated back and forth and a wiper blade connected to the associated arm 10 is caused to swing over the windshield in wiping relation.

The drive unit of the main assembly includes a shaft 44 connected in driving relation to the shaft 32 and provided with an arm 46 of the same operative dimensions as the arm 38.

The slave unit comprises a housing 48 having an extension 50 mounting the slave unit drive shaft 52. The housing 48 is provided with a removable cover 54 which encloses the interior of the housing. The shaft 52 has connected thereto in driving relation an actuating arm 56 which is identical in operative dimensions to the arms 38 and 46.

Interconnecting the arms 46 and 56 is the transmission means 24 comprising an outer slightly flexible metal tube 60 and an inner flexible push-pull cable 62. Rotatably secured to the arms 46 and 56 are identical connectors 64, the details of which are best seen at the left of FIG. 3. Here, it will be observed that the connectors have tubular end portions 66 which receive the ends of the flexible drive cable 62 and are crimped as indicated at 68 to interlock the ends of the cable with the connectors. One end of the connectors 64 is connected to the adjacent arm 46 or 54 by a pivot pin 70. The opposite ends of the connectors 64 extend into the adjacent ends of the metal tube 60 and are provided with outwardly formed beads 72 having an outer annular surface of partly spherical configuration adapted to guide the connectors in the tubes. The outer ends of the tube 60 are belled slightly outwardly as indicated at 74 to provide clearance as the outer ends of the connectors 64 swing in the arcuate path as occasioned by movement of the operating arms 46, 56.

In order to provide for free longitudinal movement of the flexible cable 62 within the slightly flexible metal tube 60, while guiding it against lateral deflection, there is provided a plastic filler tube 76 which surrounds the flexible cable 62 with a minimum of friction and restricts its movement to longitudinal movement in the arc as determined by the angular relationship between the slave and master units.

Preferably, the flexible push-pull cable is composed of a core 78 made up of a plurality of wires twisted together, as best illustrated in FIG. 5, and these wires are preferably wrapped with a flat wire to form a smooth continuous sheath 80 which is freely slidable within the plastic tube 76.

The metal tube 60 is clamped at opposite ends to the master and slave units as best illustrated in FIG. 4. Here, the transmission unit 24 is illustrated as clamped by a clip 82 by suitable clamping means such as screws 84. The plastic antifriction tube 76 terminates short of the ends of the metal tube 60 as best indicated at 86 in the right hand portion of FIG. 3, to provide for the necessary movement of the enlarged annular beads 72 a required distance into the open ends of the tube 60. With this arrangement only an extremely short portion of the flexible push-pull cable 62 is laterally unsupported, and the cable has a limited flexibility such that the short unsupported portion does not bend.

With the foregoing construction the curved transmission element 24 is mounted in fixed position in the bottom of the well 14 and the assembly of the motor and master unit and the slave unit is suitably secured and housed within the well in such a way that they may be inspected and removed if necessary for repair or replacement. The curved transmission unit comprising the flexible push-pull cable mounted within the curved metal tube is adapted to insure equal simultaneous swinging movement of the windshield wiper arms in the most efficient manner and insures simultaneous parking of both wiper arms when operation of the windshield wiper assembly is terminated.

What we claim as our invention is:

1. A windshield wiper system for an automobile having a transversely curved windshield, comprising an elongated upwardly open well forward of the windshield and curved laterally in conformity with the transverse curvature of the windshield, a motor and master drive unit assembly mounted in said well toward one end from the center thereof and accessible for repair or removal through the open top of said well, the master drive unit of said assembly having a wiper arm drive shaft extending generally perpendicular to the portion of the curved windshield thereabove, a slave drive unit mounted in said well toward the other end from the center thereof and accessible for repair or removal through the open top of said well, said slave drive unit having a wiper arm drive shaft extending generally perpendicular to the portion of said curved windshield thereabove and extending at an oblique angle to the drive shaft of said master drive unit, motion transmission means interconnecting said drive shafts, said motion transmission means comprising a push-pull flexible device curved longitudinally to conform to the lateral curvature of said well, and to accommodate the oblique angularity between said drive shafts.

2. A system as defined in claim 1 in which said motion transmission comprises like rigid arms fixed to said wiper arm drive shafts, said push-pull device including a longitudinally movable flexible push-pull element connected at its end to said arms, said push-pull device comprising a tubular housing having its ends anchored to said master and slave drive units through which said flexible push-pull element extends, said tubular housing being curved to conform to the transverse curvature of said well but being fixed in assembly, said tubular housing being dimensioned to have substantial clearance with said flexible push-pull element, and a continuous low friction tubular guide extending substantially throughout said tubular housing and having a guiding fit with said flexible push-pull element.

3. A system as defined in claim 2 in which said housing is a metal tube and said guide is a plastic tube.

4. A system as defined in claim 2 in which separate elongated connectors are secured to opposite ends of said core, said connectors having an intermediate portion having substantial lateral clearance in said tubular housing and having an annular bead of curved transverse cross-section at their ends fitting in guided relation in said housing, said connectors providing for angular displacement thereof upon movement longitudinally of said housing occasioned by their connection to said arms.

5. A system as defined in claim 2 in which said flexible push-pull element extends beyond the opposite open ends of said tubular housing, said low friction tubular guide terminating inwardly of the ends of said housing to leave annular clearance between said push-pull element and the inner surface of end portions of said housing, rigid elongated connectors fixed to opposite ends of said push-pull element pivotally connected to the rigid arms fixed to said wiper arm drive shafts, each of said connectors having a tubular end portion extending into the adjacent open end of said housing and receiving the adjacent end of said push-pull element in fixed position therein, said tubular end portion of said connector within said housing having substantial lateral clearance therewith except for an outwardly extending rounded bead at the inner end of said connector, said bead fitting in guided relation in said housing and constituting a pivot support for the inner end of said connector providing for angular displacement thereof upon movement longitudinally of said housing occasioned by rocking movement of said rigid arms.

* * * * *